Figure 1:
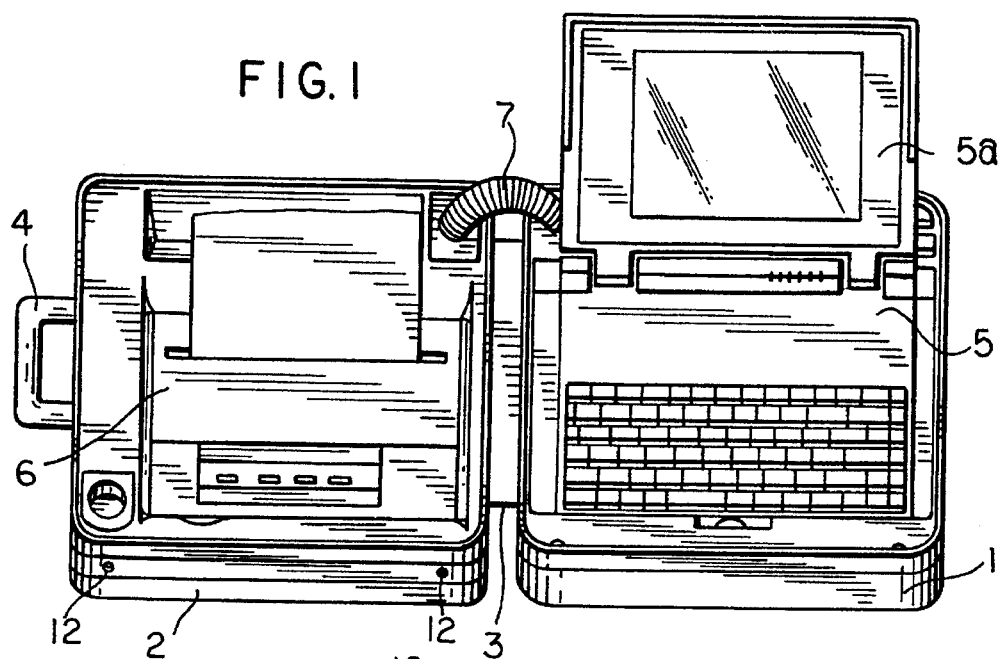

United States Patent [19]

Keskinen

[11] Patent Number: 5,555,489
[45] Date of Patent: Sep. 10, 1996

[54] PORTABLE PC COMBINATION

[75] Inventor: Kari Keskinen, Salpakankaantie 16 A 24, FIN-15870 Hollola, Finland

[73] Assignee: Kari Keskinen, Hollola, Finland

[21] Appl. No.: 209,831

[22] Filed: Mar. 11, 1994

[51] Int. Cl.[6] .................................................. H05K 7/10
[52] U.S. Cl. .......................... 361/683; 312/223.2; 400/691
[58] Field of Search .......................... 361/683; 312/223.2; 174/68.1, 69, 50.51, 50.52; 400/691, 693; G06F 1/16

[56] References Cited

U.S. PATENT DOCUMENTS

| 4,837,590 | 6/1989 | Sprague | 361/683 |
| 5,105,338 | 4/1992 | Held | 361/391 |
| 5,305,183 | 4/1994 | Teynor | 361/683 |

FOREIGN PATENT DOCUMENTS

| 155417 | 6/1951 | Australia | 174/68 |
| 0487113 | 5/1992 | European Pat. Off. | G07F 1/16 |

Primary Examiner—Leo P. Picard
Assistant Examiner—Phuong T. Vu
Attorney, Agent, or Firm—McAulay Fisher Nissen Goldberg & Kiel, LLP

[57] ABSTRACT

A portable PC combination or attache case for carrying a PC and a printer and when placed on a planar surface is positioned so that one side edge of each is along a common hinged side and when the case is in the open position in front of the user, the PC and the printer are ready for use, with their front edges toward the user. The PC, equipped with an opening cover containing a conventional screen faces a user in the open condition of the cover, and the printer are both firmly attached to a bottom section and a cover section, respectively. Inside the case a spiral spring containing cables connecting the PC and the printer and overlie the hinge connection.

16 Claims, 1 Drawing Sheet

PORTABLE PC COMBINATION

The present invention relates to a portable PC combination comprising a substantially rectangular case which is hinged on one side and houses a PC equipped with an opening cover and a printer connectable to the PC.

The popularity of portable microcomputers has recently increased sharply. Usually such a portable so-called PC is equipped with an opening cover, which at the same time serves as a display screen. For a person highly mobile in his profession, a portable PC has gradually become an indispensable tool.

In order for a portable machine to yield full benefit, it is usually necessary to connect such portable machine to a printer with which data files and other results can be printed out. Thus it is important that both devices can easily be interconnected and made ready for operation and, of course, be repacked together for being carried.

Of course, there are in existence separate cases intended for portable PCs, also cases in which a PC and a printer can both be placed, one on top of the other. In spite of this, the unpacking of the case, the interconnecting of the PC and the printer, etc., are steps which encumber the use of such a combination.

The object of the present invention is therefore to provide a portable PC combination, which can, with a minimal number of steps, be taken into use by the user and also be packed equally rapidly for being carried.

In order to achieve this object, the invention is characterized in that one of the two, the PC or the printer, is firmly placed in the bottom half of the case and the other, also firmly, in the cover half of the case, and that the PC and the printer are positioned so that one side edge of each is along the hinged side of the case; thus, when the case is in the open position and the user is facing the screen when the PC is opened, the hinge side is printed in an orthogonal direction to the user when facing the screen and the PC and the printer are side by side with their front edges toward the user, and that the PC and the printer are additionally interconnected across the hinge via connecting cables running inside the case. When the PC cover containing the screen is opened along a first axis, the hinge connection is oriented along a second axis in an orthogonal direction to the first axis.

As a result of this arrangement, when the case with the PC and the printer placed in its different halves is opened in front of the PC and its printer are ready in their position of use in front of the user. The only step to be carried out after this, unless the user decides to use the battery carried in the case, is to connect the combination to the electric mains by using a single power cord.

For fitting the devices tightly in the two halves of the case, hollow plastic parts are used in which space is provided for the connecting cables and the power cord. For the connecting cables between the two halves of the case there is most preferably provided, between the plastic parts mentioned above, a spiral spring having a rather large diameter, the connecting cables running inside it.

Figure 2:
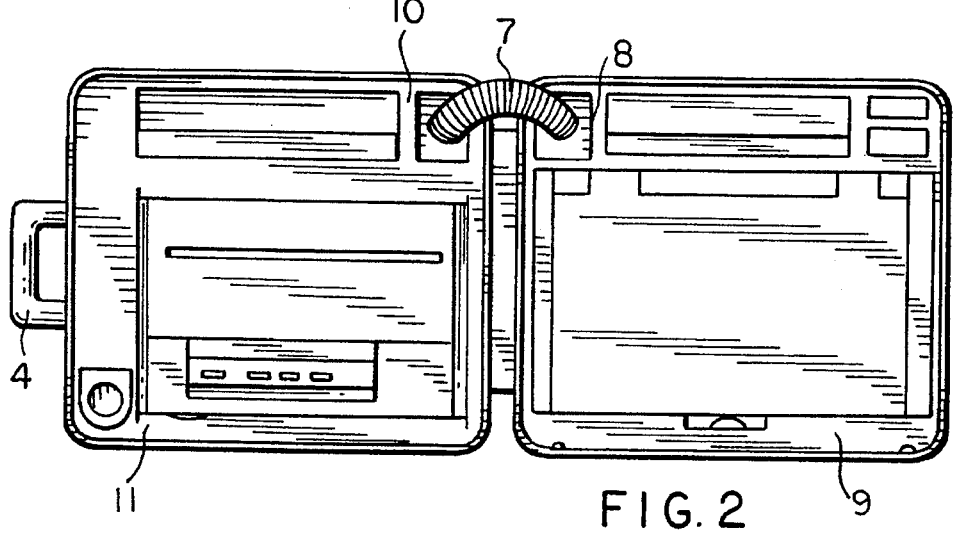
Figure 3:
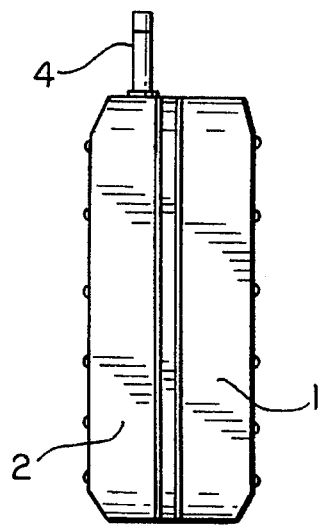

The invention and its other characteristics are described below in greater detail, in the form of an example and with reference to the accompanying drawing, in which FIG. 1 depicts the combination according to the invention in its position of use, FIG. 2 is a top view of the same combination, with the PC cover closed, and FIG. 3 depicts the case of the combination, with the case closed for being carried.

The combination according to the invention comprises a substantially rectangular case of a suitable size, the case being made up of a bottom section 1, a cover section 2, and a hinge part 3 interlinking these. The case is a so-called attaché case of a plastic which is durable in a known manner, there being a carrying handle 4 on the side opposite to the hinge, in this case in the cover section 2 of the case.

In accordance with the invention, a PC 5 equipped with an opening cover 5a and a printer 6 connected to the PC are positioned in a case so that in the open position of the case, shown in FIG. 1, the side edges of the PC 5 and the printer 6 run parallel to the hinge 3. Furthermore, in the closed position of the case the PC and the printer have their tops against each other, and thus in the open position both devices will be in front of the user, side by side in a position ready for use.

Between the inner side of a case half and respectively the edge of the device concerned, i.e. the PC or the printer, there are preferably used adapter pieces of hollow plastic, such as parts 8–11 shown in FIG. 2, by means of which a tight fit is achieved between the case and the PC and respectively the printer, and which at the same time have suitable hollow inner spaces for the storing of connecting cables and power cords and possibly other equipment. Thus the combination has a very neat appearance even in the open position of the case.

Also, the adapter pieces are designed as variable sets so as to allow for tight installation of PC's and printers of different module size.

In the embodiments shown in the figures, suitable holes have been made in the adapter parts 8 and 10, the opposite ends of a spiral spring 7 being attached to these holes. The connecting cables between the PC and the printer run inside this spring. These connecting cables most preferably include a power supply cord, since it is not sensible to connect the combination to the batteries or to the electric mains with more than one power cord.

The plastic adapter parts 8–11 also have suitable surface recesses for various additional equipment. One recess may be, for example, for a mobile telephone, which telephone may be connectable to the PC.

In addition to the adapter parts 8–11 which enable a tight fit to be achieved, there may be a further arrangement for locking the PC and/or the printer by separate means to the case half itself. In the embodiment shown in the figures, adapter part 9 has a movable tongue or other equivalent part by means of which the front edge of the PC is locked to the adapter part 9. In the edge of the cover half of the case there are locking pins 12 which can be pushed in and turned and by means of which the printer is locked firmly to the cover section of the case. The printer is heavier than the PC, and therefore a firmer attachment may be necessary. For this reason it is also appropriate that the handle 4 of the case is attached to the same section of the case as is the printer.

I claim:

1. A combination of a printer, a portable PC with cover, and a portable PC combination carrier for transporting said printer and portable PC connected together, comprising:

an attaché case composed of a bottom section for receiving and holding one of said printer or portable PC, and a cover section for receiving and holding the other of said printer or portable PC;

a hinge connection pivotally connecting said bottom section and said cover section of the case so as to support the printer and said PC in a side-by-side relationship in an open condition of said attaché case and with a screen of the portable PC facing a user when a cover for the PC containing the screen is opened along a first axis, and said hinge connection along a second axis which is oriented in an orthogonal direction to the first axis when said cover section is opened;

said cover section in a closed condition of said portable PC combination overlying said bottom section and in an open condition said cover section and said bottom section being adapted to lie on a common planar surface with said portable PC and said printer being in said side-by-side relationship with said printer and said portable PC being juxtaposed to each other with their front edges toward the user.

2. The portable PC combination according to claim 1, including means for locking said printer and said portable PC to said case so that said printer and said portable PC overlie each other in a closed condition of said case depending upon which of said bottom section and said supporting section is below the other.

3. The portable PC combination according to claim 1, including supporting plastic parts fitted in said cover section and said bottom section, said plastic parts having an area for storage and throughput of cables and cords.

4. The portable PC combination according to claim 1, including a spiral spring connected to said bottom section and said cover section and overlying said hinge connection when said bottom section and said cover section are open and extending across said hinge in the closed condition of said cover section and said bottom section, said spiral spring providing an enclosure through which cables connecting the printer and the PC extend across said hinge connection.

5. The portable PC combination according to claim 1, wherein in the open condition of said attache case side edges of the PC and the printer are parallel to the second axis of said hinge, and in the closed condition of said attache case tops of the printer and the PC are against each other.

6. The portable PC according to claim 1, including adapter pieces of hollow plastic to provide a tight fit between the case and the PC and between the printer and the case.

7. The portable PC combination according to claim 6, wherein the adapter pieces are variable sets to provide for tight installation of PC's and printers of different module size.

8. The portable PC combination according to claim 1, including adapter parts having openings, a spiral spring having each end attached to one of said openings and extending transversely across the second axis of said hinge for enclosing connecting cables connecting the printer and the PC, and one of the cables including a single power supply cord for connection to a power source.

9. The portable PC combination according to claim 1, including adapter parts in said attache case having surface recesses for receiving various equipment for use with said PC.

10. The portable PC combination according to claim 1, including an adapter part fixed to said bottom section and having a movable tongue locking the PC to said adapter part.

11. The portable PC combination according to claim 1, wherein the printer is in the cover section and including locking pins in the cover section transversely movable into the case and rotatable for locking the printer to the cover section.

12. The portable PC combination according to claim 1, including providing a handle on the cover section holding the printer.

13. The portable PC combination according to claim 1, including providing a handle on the outside of said cover section of the attache case to support the heavier side of the portable PC combination.

14. The portable PC combination according to claim 1, including a spiral spring connected to said bottom section and said cover through which said connecting cables pass between the PC and the printer and overlie and across said hinge.

15. The portable PC combination according to claim 1, including plastic parts in said bottom section and said cover section for retaining the ends of said spiral spring.

16. The portable PC combination according to claim 1, including retainer means for holding the PC and the printer in place.

* * * * *